(12) United States Patent
Segal et al.

(10) Patent No.: US 6,212,362 B1
(45) Date of Patent: Apr. 3, 2001

(54) METHOD AND APPARATUS FOR FACILITATING A RETRANSMISSION OF MISSED MESSAGES IN A WIRELESS MESSAGING SYSTEM

(75) Inventors: Niranjan Nath Segal, Arlington; Robert Louis Breeden, Azle, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/256,284

(22) Filed: Feb. 23, 1999

(51) Int. Cl.[7] ............... H04B 7/00; G08C 25/02
(52) U.S. Cl. ............ 455/31.3; 455/38.1; 714/748
(58) Field of Search ............. 455/31.3, 31.2, 455/31.1, 38.1; 340/825.44; 714/748, 749, 746

(56) References Cited

U.S. PATENT DOCUMENTS

| | | | |
|---|---|---|---|
| 4,439,859 | * 3/1984 | Donnan | 714/748 |
| 5,159,331 | * 10/1992 | Park et al. | 340/825.44 |
| 5,291,192 | * 3/1994 | Ichikawa et al. | 340/825.44 |
| 5,596,318 | * 1/1997 | Mitchell | 340/825.44 |
| 5,682,148 | * 10/1997 | Gaskill et al. | 340/825.44 |
| 5,926,109 | * 7/1999 | Narusawa | 340/825.44 |
| 6,112,096 | * 8/2000 | Hasegawa | 455/458 |

* cited by examiner

Primary Examiner—Vivian Chang
Assistant Examiner—Charles N. Appiah
(74) Attorney, Agent, or Firm—Robert L. Breeden

(57) ABSTRACT

A subscriber unit (122) in a wireless messaging system records (404) a message sequence number corresponding to a message received, and an indication of whether the subscriber unit acknowledged the message. Upon registration with a two-way portion (104) of the wireless messaging system, the subscriber unit reports (532, 526), to the two-way portion, information of a type selected from (a) missing message sequence numbers, and (b) message sequence numbers corresponding to messages received and not acknowledged, the type selected (524) being that which generates a smaller amount of inbound traffic.

14 Claims, 3 Drawing Sheets

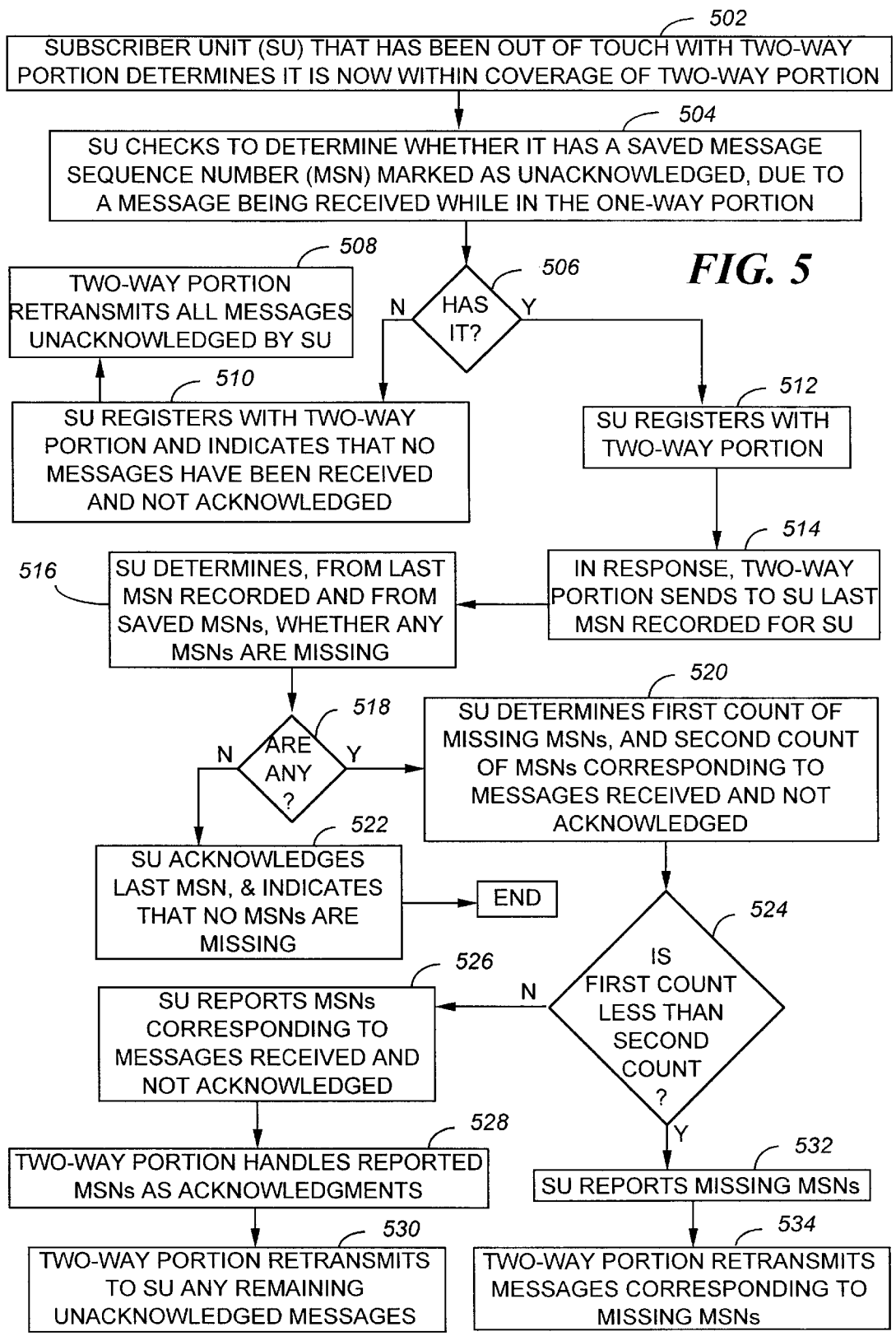

METHOD AND APPARATUS FOR FACILITATING A RETRANSMISSION OF MISSED MESSAGES IN A WIRELESS MESSAGING SYSTEM

FIELD OF THE INVENTION

This invention relates in general to wireless messaging systems, and more specifically to a method and apparatus for facilitating a retransmission of missed messages in a wireless messaging system having a two-way portion and a one-way portion.

BACKGROUND OF THE INVENTION

Two-way wireless messaging systems are becoming increasingly popular. Such systems can provide "guaranteed" message delivery, as well as subscriber unit initiated messages and responses.

To provide reliable inbound messaging from portable subscriber units to the fixed portion of the system, a sufficient number of properly located base receivers are required. Naturally, the cost of the base receivers is easier to justify in areas of high subscriber density than in areas of low subscriber density. For this reason, two-way messaging service providers sometimes elect to provide a mix of two-way and one-way coverage areas in their systems. A service provider may offer, for example, two-way coverage in the metropolitan portions of his system and one-way coverage in the rural portions.

A system having a mix of one-way and two-way portions presents a problem with regard to guaranteed message delivery. Such mixed systems typically simulcast messages throughout the one-way portion, while using either simulcast or directed message delivery in the two-way portion. When a subscriber unit leaves the two-way portion, the controller of the messaging system stops receiving acknowledgments from the subscriber unit in response to messages received by the subscriber unit. The controller can save the non-acknowledged messages for retransmission to the subscriber unit when the subscriber unit again registers with the two-way portion, but the controller must first learn which, if any, of the non-acknowledged messages were actually missed by the subscriber unit. Simply retransmitting all the non-acknowledged messages would be wasteful of airtime and potentially confusing to the subscriber.

Thus, what is needed is a method and apparatus for facilitating a retransmission of missed messages in a wireless messaging system having a two-way portion and a one-way portion. Preferably, the method and apparatus will provide for the retransmission of only the messages which were actually missed, and will operate in a manner that minimizes the inbound communication traffic required between the subscriber unit and the two-way portion of the system for determining the missed messages.

BRIEF DESCRIPTION OF THE DRAWINGS

FIG. 5 is a flow diagram depicting operation of the wireless messaging system in accordance with the present invention.

DETAILED DESCRIPTION OF THE DRAWINGS

Figure 1:
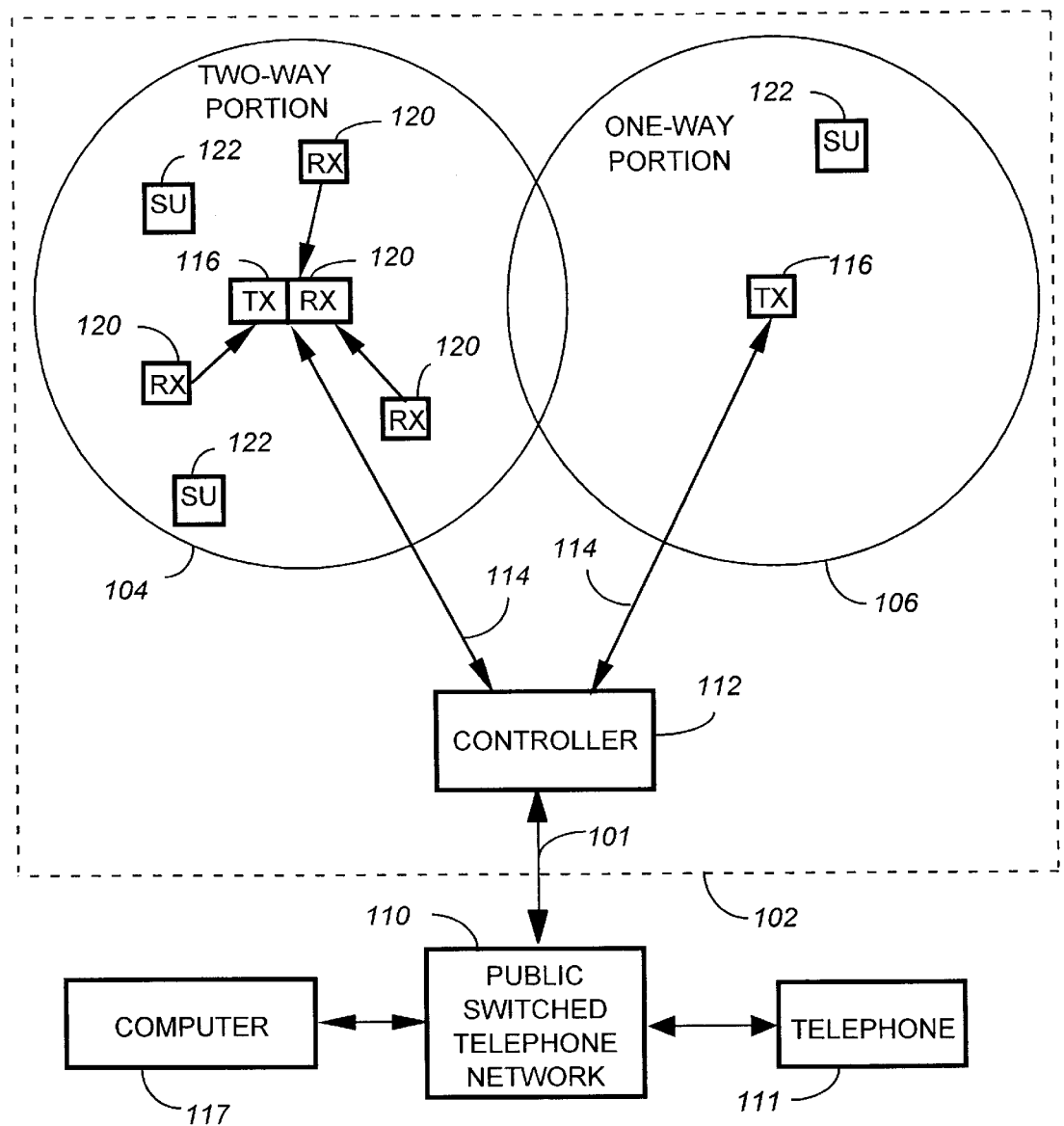
FIG. 1 is an electrical block diagram of an exemplary wireless messaging system in accordance with the present invention.

Referring to FIG. 1, an electrical block diagram depicts an exemplary wireless messaging system in accordance with the present invention, comprising an infrastructure 102 including a controller 112, a plurality of conventional base transmitters 116, and a plurality of base receivers 120, the messaging system also including a plurality of subscriber units 122. The base transmitters 116 and the base receivers 120 preferably communicate with the subscriber units 122 utilizing conventional radio frequency (RF) techniques, and are coupled by conventional communication links 114 to the controller 112, which controls the base transmitters 116 and the base receivers 120. The infrastructure 102 comprises a two-way portion 104 which is equipped with the base receivers 120 and thus is capable of supporting reliable two-way communications with the subscriber units 122. The infrastructure 102 further comprises a one-way portion 106 in which the subscriber units 122 can receive messages from the base transmitter 116, but cannot reliably acknowledge the messages, because there are no base receivers 120 in the one-way portion 106.

The hardware of the controller 112 is preferably a combination of a Choreographer!® network management device, a Wireless Messaging Gateway (WMG™) Administrator!™ terminal, an RP-Usher!™ multiplexer, and an RF-Conductor!® message distributor manufactured by Motorola, Inc., and utilizes software modified in accordance with the present invention. The base transmitters 116 are preferably similar to the RF-Orchestra!™ transmitter manufactured by Motorola, Inc. The base receivers 120 are preferably similar to the RF-Audience!® receiver, also manufactured by Motorola, Inc. The subscriber units 122 are preferably similar to PageWriter® 2000 data subscriber units, also manufactured by Motorola, Inc., and also utilize software modified in accordance with the present invention. It will be appreciated that other similar hardware can be used as well for the controller 112, the base transmitters 116, the base receivers 120, and the subscriber units 122.

The RF signals transmitted by the base transmitters 116 to the subscriber units 122 (outbound messages) comprise selective call addresses identifying the subscriber units 122, and data messages originated by a message originator, as well as commands originated by the controller 112 for adjusting operating parameters of the radio messaging system. The RF signals preferably transmitted by the subscriber units 122 to the base receivers 120 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX® family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
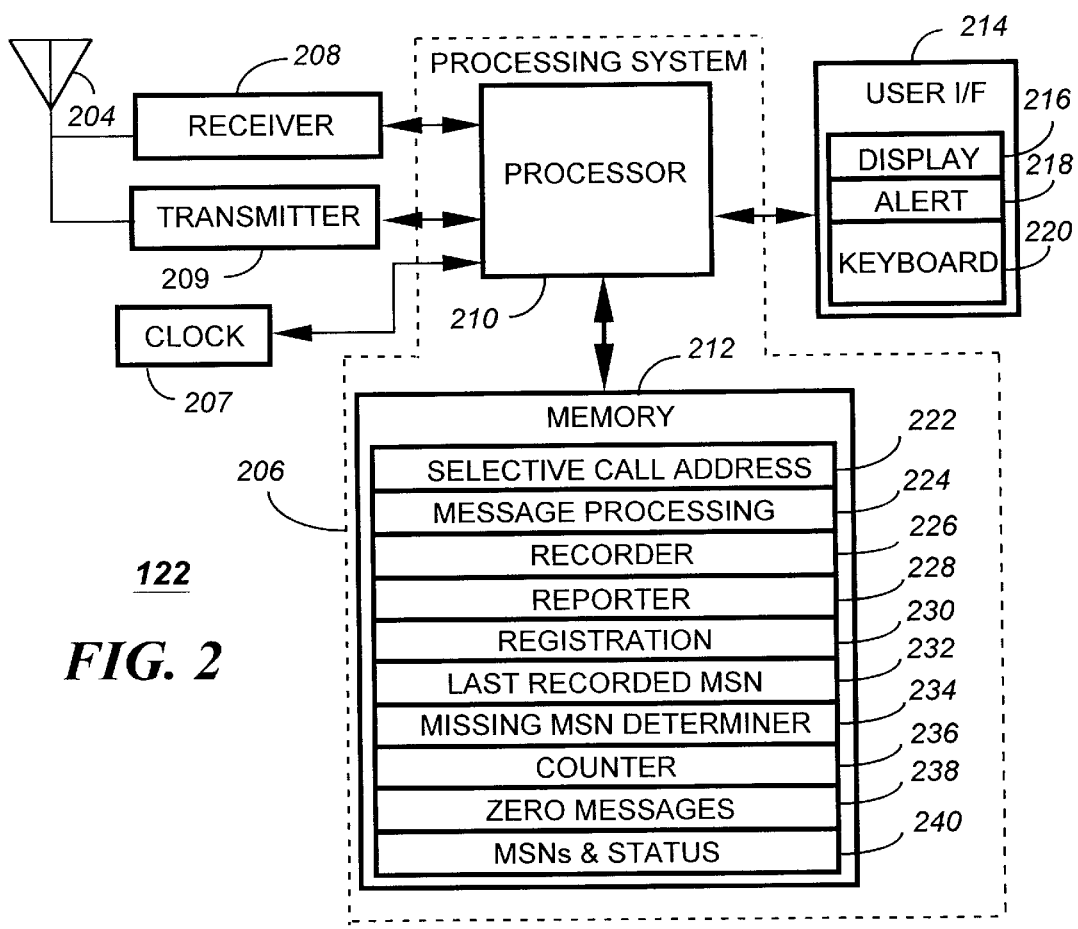
FIG. 2 is an electrical block diagram of an exemplary subscriber unit in accordance with the present invention.

FIG. 2 is an electrical block diagram of the subscriber unit 122 in accordance with the present invention. The subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the subscriber unit 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the subscriber unit 122. A conventional clock 207 is also coupled to the processing system 206 for supporting time keeping requirements of the subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the subscriber unit 122 is responsive. In addition, the memory 212 includes a message processing element 224 for programming the processing system 206 to process messages through well-known techniques. The memory 212 further comprises a recorder program 226 for programming the processing system 206 to record in the memory 212 an outbound message sequence number (MSN) corresponding to a message received, and an indication of whether the subscriber unit 122 acknowledged the message. The memory 212 also includes a reporter program 228 for programming the processing system 206 to report to the two-way portion upon registration with the two-way portion, information of a type selected from (a) missing message sequence numbers, and (b) message sequence numbers corresponding to messages received and not acknowledged, the type selected being that which generates a smaller amount of inbound traffic.

The memory 212 also includes a registration program 230 for programming the processing system 206 to cooperate with the transmitter 209 to register the subscriber unit 122 with the two-way portion of the infrastructure 102 when the subscriber unit 122 is within coverage of the two-way portion, using well-known techniques. The memory 212 further comprises space for storing a last recorded outbound MSN 232 associated with the subscriber unit 122 and received from the two-way portion in response to a registration by the subscriber unit 122. The memory 212 also includes a missing MSN determiner program 234 for programming the processing system 206 to determine from the last recorded outbound MSN and from a list of outbound MSNs and status 240, whether there are any outbound MSNs missing from the list, using well-known techniques.

The memory 212 also includes a counter program 236 for programming the processing system 206 to determine a first count of the missing message sequence numbers, and a second count of the message sequence numbers corresponding to the messages received and not acknowledged. The counter program preferably cooperates with the reporter program 228 to report the missing message sequence numbers to the two-way portion, when the first count is less than the second count; and to report to the two-way portion the message sequence numbers corresponding to the messages received and not acknowledged, when the first count is not less than the second count.

In addition, the memory 212 includes a zero messages program 238 for programming the processing system 206 to determine, immediately prior to registration with the two-way portion, that no messages have been received and not acknowledged, and, in response, to cooperate with the reporter program 228 to report upon registration that no messages have been received and not acknowledged. Operation of the subscriber unit 122 in accordance with the present invention will be described in detail further below.

Figure 3:
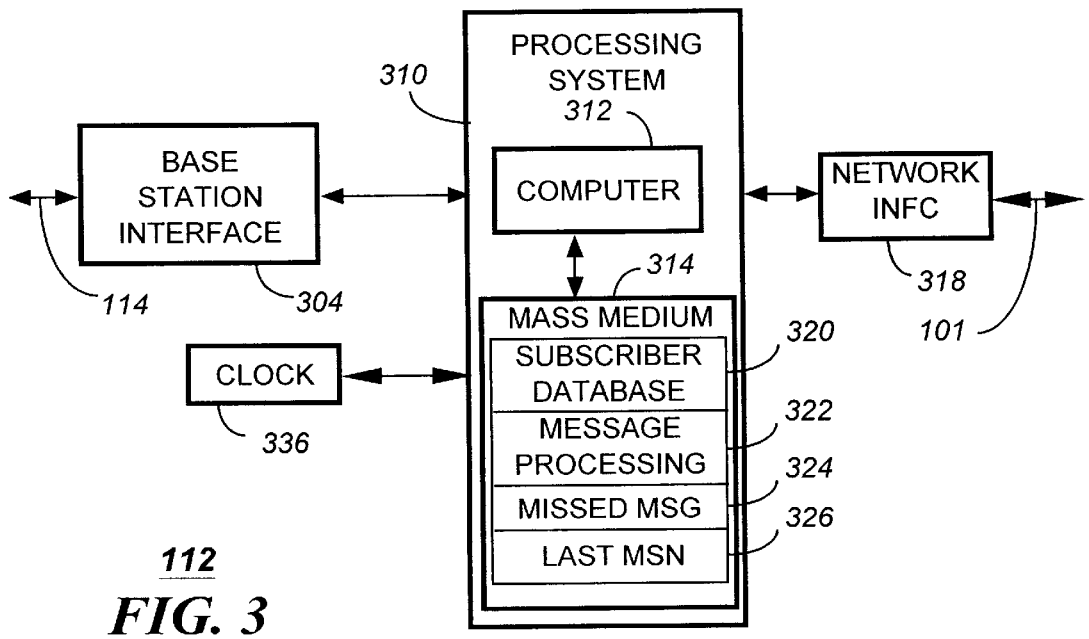
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system 310 is coupled to a base station interface 304 for controlling and communicating with the base transmitters 116 and the base receivers via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a subscriber database 320 for storing profiles defining service for subscribers using the system. In addition, the processing system 310 maintains in the subscriber database 320 a list of messages and corresponding outbound MSNs sent to each subscriber and not acknowledged by the subscriber. The mass medium 314 further comprises a message processing element 322 for processing messages through well-known techniques.

In addition, the mass medium 314 includes a last MSN program for programming the processing system 310 to send to the subscriber unit 122 the last outbound MSN recorded in the subscriber database 320 for the subscriber unit 122 in response to a registration by the subscriber unit 122 with the two-way portion 104 of the messaging system. The mass medium 314 also includes a missed message program 324 for programming the processing system 310 cooperate with the base station interface 304 to receive missing message sequence numbers from the subscriber unit 122; and, in response, retransmit to the subscriber unit 122 the messages corresponding to the missing message sequence numbers. In addition, the missed message program 324 is for programming the processing system 310 cooperate with the base station interface 304 to receive from the subscriber unit 122 the message sequence numbers corresponding to the messages received and not acknowledged; and, in response, to handle the message sequence numbers as acknowledgments of the messages received and not acknowledged. The processing system 310 then preferably retransmits to the subscriber unit 122 any messages previously sent to the subscriber unit 122 that have not been acknowledged after handling the received message sequence numbers as acknowledgments. Operation of the controller 112 in accordance with the present invention will be described further below.

Figure 4:
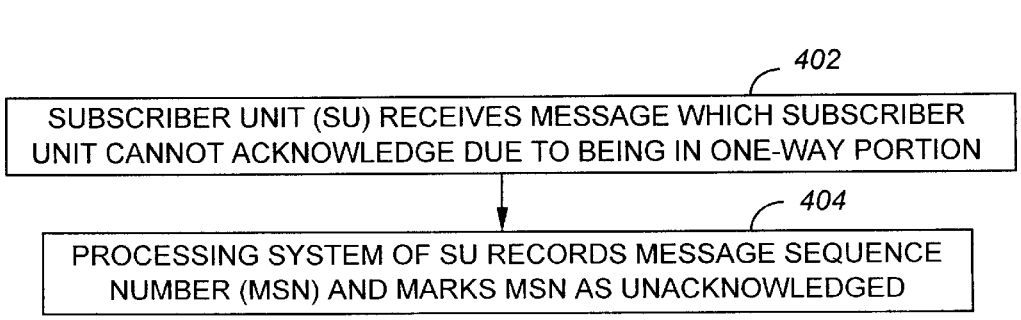
FIG. 4 is a flow diagram depicting operation of the subscriber unit in accordance with the present invention.

FIG. 4 is a flow diagram depicting operation of the subscriber unit in response to receiving a nonacknowledgeable message in accordance with the present invention. The flow begins when the subscriber unit 122 receives 402 a message which the subscriber unit 122 cannot acknowledge, because, for example, the subscriber unit 122 is in the one-way portion 106. In response, the processing system 206 records 404 the outbound MSN sent with the message, and marks the MSN as not acknowledged, e.g., by setting a predetermined flag stored with the MSN in the space in the memory 212 for the MSNs & status 240.

FIG. 5 is a flow diagram depicting operation of the wireless messaging system in accordance with the present invention. The flow begins when a subscriber unit 122 that has been out of touch with the two-way portion 104 determines 502, through well-known techniques, that it is now within the coverage of the two-way portion 104. Reasons for being out of touch can include moving into the one-way portion 106, moving entirely out of the wireless messaging system, and the subscriber unit 122 being switched off. When the subscriber unit 122 is in the one-way portion 106, the subscriber unit 122 should receive most of its messages, but will not be able to acknowledge them until returning to the two-way portion. When the subscriber unit 122 is entirely out of the wireless messaging system coverage, or switched off, the subscriber unit 122 will miss all of its messages. When the subscriber unit 122 later returns to the two-way portion, the subscriber unit 122 preferably cooperates with the two-way portion to determine jointly which messages need to be retransmitted, as described below.

At step 504, the processing system 206 of the subscriber unit 122 checks 504 whether it has, in the list of MSNs and status 240, at least one saved outbound MSN marked as unacknowledged, due to at least one message being received while the subscriber unit 122 was in the one-way portion 106. If not, at step 506, the flow moves to step 510, where the subscriber unit 122 registers with the two-way portion and indicates that no messages have been received and not acknowledged. In this case, any messages marked as sent and not acknowledged in the subscriber database 320 of the controller 112 must have been missed, i.e., not received, by the subscriber unit 122, because the subscriber unit 122 has no knowledge of the messages. Thus, in response to the registration, the processing system 310 of the controller 112 responds through the base station interface and the base transmitters 116 by retransmitting 508 all messages which the subscriber database 320 shows were sent and not acknowledged by the subscriber unit 122.

If, on the other hand, at step 506 the subscriber unit 122 has at least one saved outbound MSN marked as unacknowledged, then the subscriber unit 122 simply registers 512 with the two-way portion. In response to the registration, the processing system 310 sends 514 to the subscriber unit 122 the last outbound MSN recorded for the subscriber unit 122 in the subscriber database 320. The processing system 206 of the subscriber unit 122 then determines 516, from the last outbound MSN recorded and from the saved MSNs and status 240, whether any outbound MSNs are missing. This is easily accomplished, because the MSNs preferably use a predetermined sequence, e.g., incrementing the MSN by unity, for each subsequent outbound message. Thus, any gaps in the sequence up to and including the last outbound MSN recorded for the subscriber unit 122 are easily identified. At step 518, if no MSNs are missing, the processing system 206 controls the transmitter 209 to acknowledge the receipt of the last outbound MSN recorded, and includes an indication that no MSNs are missing, after which the process ends.

If, on the other hand, at step 518 at least one MSN is missing, then the processing system 206 determines 520 a first count of the missing message sequence numbers, and a second count of the message sequence numbers corresponding to the messages received and not acknowledged. Next, the processing system 206 checks 524 whether the first count is less than the second count. If so, less airtime is required to report the smaller number of missing MSNs, so the processing system 206 controls the transmitter 209 to report 532 the missing MSNs (with, of course, an indication that the MSNs are missing). In response, the controller 112 retransmits 534 the stored messages corresponding to the missing MSNs to the subscriber unit 122. If, on the other hand, at step 524 the first count is not less than the second count, then less (or equal) airtime is required to report the smaller (or equal) number of MSNs corresponding to messages received and not acknowledged. In this case, the processing system 206 controls the transmitter 209 to report 526 the MSNs corresponding to messages received and not acknowledged (with, of course, an indication that the MSNs are for received messages). In response, the controller 112 handles 528 the reported MSNs as acknowledgments, and then retransmits 530 to the subscriber unit 122 any remaining unacknowledged messages.

Thus, it should be clear from the preceding disclosure that the present invention advantageously provides a method and apparatus for facilitating a retransmission of missed messages in a wireless messaging system having a two-way portion and a one-way portion. Advantageously, the method and apparatus provides for the retransmission of only the messages which were actually missed, and operates in a manner that minimizes the inbound communication traffic required between the subscriber unit and the two-way portion of the system for determining the missed messages.

Many modifications and variations of the present invention are possible in light of the above teachings. Thus, it is to be understood that, within the scope of the appended claims, the invention can be practiced other than as specifically described herein above.

What is claimed is:

1. A method for facilitating a retransmission of missed messages in a wireless messaging system having a two-way portion and a one-way portion, the method comprising the steps of:

recording, by a subscriber unit, a message sequence number corresponding to a message received, and an indication of whether the subscriber unit acknowledged the message; and reporting, by the subscriber unit to the two-way portion upon registration with the two-way portion, information of a type selected from (a) missing message sequence numbers, and (b) message sequence numbers corresponding to messages received and not acknowledged, the type selected being that which generates a smaller amount of inbound traffic.

2. The method of claim 1, wherein the reporting step comprises the steps of:

registering, by the subscriber unit, with the two-way portion;

sending in response, from the two-way portion to the subscriber unit, a last recorded message sequence number associated with the subscriber unit; and determining from the last recorded message sequence number whether there are any missing message sequence numbers.

3. The method of claim 1, wherein the reporting step comprises the steps of:

determining a first count of the missing message sequence numbers, and a second count of the message sequence numbers corresponding to the messages received and not acknowledged;

reporting the missing message sequence numbers when the first count is less than the second count; and reporting the message sequence numbers corresponding to the messages received and not acknowledged when the first count is not less than the second count.

4. The method of claim 1, further comprising in the two-way portion the steps of:

receiving the missing message sequence numbers from the subscriber unit; and in response, retransmitting to the subscriber unit the messages corresponding to the missing message sequence numbers.

5. The method of claim 1, further comprising in the two-way portion the steps of:

receiving from the subscriber unit the message sequence numbers corresponding to the messages received and not acknowledged;

in response, handling the message sequence numbers as acknowledgments of the messages received and not acknowledged; and retransmitting to the subscriber unit any messages previously sent to the subscriber unit that have not been acknowledged after the handling step.

6. The method of claim 1, further comprising in the subscriber unit the step of:

determining, immediately prior to registration with the two-way portion, that no messages have been received and not acknowledged, and, in response, reporting upon registration that no messages have been received and not acknowledged.

7. A subscriber unit for facilitating a retransmission of missed messages in a wireless messaging system having a two-way portion and a one-way portion, the subscriber unit comprising:

a receiver for receiving messages;

a processing system coupled to the receiver for processing the messages; and a transmitter coupled to the processing system for acknowledging the messages, wherein the processing system is programmed to:

record a message sequence number corresponding to a message received, and an indication of whether the subscriber unit acknowledged the message; and report, to the two-way portion upon registration with the two-way portion, information of a type selected from (a) missing message sequence numbers, and (b) message sequence numbers corresponding to messages received and not acknowledged, the type selected being that which generates a smaller amount of inbound traffic.

8. The subscriber unit of claim 7, wherein the processing system is further programmed to:

cooperate with the transmitter to register the subscriber unit with the two-way portion;

receive from the two-way portion a last recorded message sequence number associated with the subscriber unit; and determine from the last recorded message sequence number whether there are any missing message sequence numbers.

9. The subscriber unit of claim 7, wherein the processing system is further programmed to:

determine a first count of the missing message sequence numbers, and a second count of the message sequence numbers corresponding to the messages received and not acknowledged;

report the missing message sequence numbers to the two-way portion, when the first count is less than the second count; and report to the two-way portion the message sequence numbers corresponding to the messages received and not acknowledged, when the first count is not less than the second count.

10. The subscriber unit of claim 7, wherein the processing system is further programmed to:

determine, immediately prior to registration with the two-way portion, that no messages have been received and not acknowledged, and, in response, report upon registration that no messages have been received and not acknowledged.

11. A controller for facilitating a retransmission of missed messages in a wireless messaging system having a two-way portion and a one-way portion, the controller comprising:

a network interface for receiving a message from a message originator;

a processing system coupled to the network interface for processing the message;

a base station interface coupled to the processing system for controlling a base transmitter to transmit the message and for cooperating with a base receiver to receive an acknowledgment to the message, wherein the processing system is programmed to:

receive, from a subscriber unit when registering with the two-way portion, information of a type selected from (a) missing message sequence numbers, and (b) message sequence numbers corresponding to messages received and not acknowledged; and determine, from the information of either type, which of a list of non-acknowledged messages should be retransmitted to the subscriber unit.

12. The controller of claim 11, wherein the processing system is further programmed to:

receive a registration from the subscriber unit, the registration being made with the two-way portion; and send, in response to the subscriber unit, a last recorded message sequence number associated with the subscriber unit.

13. The controller of claim 11, wherein the processing system is further programmed to:

receive the missing message sequence numbers from the subscriber unit; and in response, retransmit to the subscriber unit the messages corresponding to the missing message sequence numbers.

14. The controller of claim 11, wherein the processing system is further programmed to:

receive from the subscriber unit the message sequence numbers corresponding to the messages received and not acknowledged;

in response, handle the message sequence numbers as acknowledgments of the messages received and not acknowledged; and retransmit to the subscriber unit any messages previously sent to the subscriber unit that have not been acknowledged after handling the message sequence numbers as acknowledgments.

* * * * *